United States Patent
Blanche

(10) Patent No.: US 11,487,244 B2
(45) Date of Patent: Nov. 1, 2022

(54) METHOD TO TRANSLATE A NON-COLLIMATED OPTICAL BEAM

(71) Applicant: Arizona Board of Regents on Behalf of the University of Arizona, Tucson, AZ (US)

(72) Inventor: Pierre Alexandre Blanche, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 128 days.

(21) Appl. No.: 16/762,618

(22) PCT Filed: Nov. 7, 2018

(86) PCT No.: PCT/US2018/059633
§ 371 (c)(1),
(2) Date: May 8, 2020

(87) PCT Pub. No.: WO2019/094475
PCT Pub. Date: May 16, 2019

(65) Prior Publication Data
US 2020/0278643 A1    Sep. 3, 2020

Related U.S. Application Data

(60) Provisional application No. 62/584,407, filed on Nov. 10, 2017.

(51) Int. Cl.
*G03H 1/26* (2006.01)
*G03H 1/02* (2006.01)

(52) U.S. Cl.
CPC .............. *G03H 1/268* (2013.01); *G03H 1/02* (2013.01); *G03H 2001/0216* (2013.01); *G03H 2001/0232* (2013.01); *G03H 2223/23* (2013.01)

(58) Field of Classification Search
CPC ............... G02B 26/08; G02B 26/0808; G02B 26/0875; G02B 26/10; G02B 7/021; G02B 7/10; G02B 7/102; G02B 7/105; G02B 3/0075; G03H 2001/0216; G03H 2001/0224; G03H 2001/0232; G03H 1/2645; G03H 1/265; G03H 2001/2655–2675; G03H 2223/17; G03H 2223/19; G03H 2223/23; G03H 2225/00; G03H 2225/12; G03H 1/268; G03H 1/02; G03H 2001/2695; G03H 1/30; Y02E 10/52
See application file for complete search history.

(56) References Cited

U.S. PATENT DOCUMENTS

| | | |
|---|---|---|
| 6,266,167 B1 | 7/2001 | Klug et al. |
| 6,819,469 B1 | 11/2004 | Koba |
| 7,887,722 B1 | 2/2011 | Wu |
| 2012/0008482 A1* | 1/2012 | Bablumyan .............. G03H 1/04 |

FOREIGN PATENT DOCUMENTS

WO    2005038505 A1    4/2005

OTHER PUBLICATIONS

International Search Report and Written Opinion for App. No. PCT/US2018/059633; dated Mar. 15, 2019; 12 pages.

* cited by examiner

*Primary Examiner* — Kimberly N. Kakalec
(74) *Attorney, Agent, or Firm* — Smith, Gambrell & Russell LLP

(57) ABSTRACT

The present disclosure relates to systems and methods for translating optical beams.

15 Claims, 5 Drawing Sheets

METHOD TO TRANSLATE A NON-COLLIMATED OPTICAL BEAM

CROSS-REFERENCE TO RELATED APPLICATION

This application is a National Phase filing of International (PCT) Application Number PCT/US2018/059633, filed Nov. 7, 2018, which claims the benefit of U.S. Provisional Application No. 62/584,407, filed Nov. 10, 2017, each of which are hereby incorporated by reference in their entirety.

TECHNICAL FIELD

The technical field generally relates to holographic stereograms. More specifically, the technical field relates to recording of refreshable holographic stereograms.

BACKGROUND

Holographic stereograms (HSs) are among the most impressive 3D images in terms of parallax and depth rendering. They have the ability to display saturated colors, reproduce occlusion, and approximate the wavefront so some level of accommodation is provided. No special glasses are required to view HSs, and there exist stunning examples of this technique being used advantageously for medical, architectural, and military applications.

HSs are a class of integral imaging where the angular information is stored as holographic pixels (or hogels). Contrary to regular pixels which emit the same color and intensity in every direction, hogels diffract the light in a structured cone where the intensity and/or color can change depending on the viewing angle. This angular disparity provides different images to each of the viewer's eyes such that the brain can reconstruct the 3D scene. Thanks to the large angular density that holographic recording supports, an HS provides a smooth transition between different points of view, which is not necessarily the case for other integral imaging techniques.

Photorefractive polymer screens have been used to make the HS updatable instead of permanent. Photorefractive polymers are holographic recording materials where the hologram can be erased and refreshed at will. The technique was subsequently improved to increase the refreshing speed from minutes to seconds, to display full color, and to capture live 3D images such as required for telepresence.

The use of HSs for refreshable 3D display has several advantages over "regular" holography, as well as computer generated holograms (CGHs). Here, regular holography may be defined as the interference of a reference beam with a beam reflected from the object to be recorded. This interference can be produced in either the Denisyuk (reflection), or Leith and Upatnik (transmission) configurations. To be able to record the wavefront of interest, a regular holographic setup requires the actual object to be present on the optical table. This is not much of an issue for the production of permanent holograms, whose purpose is to be displayed at a later time and in another location. However, in the case of a refreshable hologram, whose purpose is to be erased and replaced shortly after recording, one can question the usefulness of the holographic image when the genuine object is directly accessible to the viewer.

This observation is true for a physical object, but it is also valid when the object beam is formed with the reflection from a spatial light modulator (SLM). In both cases, the holographic material only acts as a relay to record the interference pattern, and the viewer can as easily look directly at the object or the SLM that is on the table. In these specific cases, the viewer would see the exact same image (or better) than the one produced by the hologram.

An updatable holographic display may be relevant if the information composing the image can be sent over a long distance, which is not the case for a regular holographic recording system.

CGHs have been proposed as the mechanism to design the ultimate 3D display. So far, this is the only technique that has been proven capable of reproducing all the visual cues. However, this capacity comes at a very high computational cost, and requires a modulator with very high space-bandwidth product. These demands are so stringent that even today, there is no system capable of handling the feed for a large, high resolution, video rate CGH display. Existing solutions, although impressive accomplishments, either scale down size or resolution, or rely on sub-aperture holograms and eye tracking.

Improvements are needed.

SUMMARY

Described herein is a translational beam mechanism (e.g., scanner) that may be used in various applications including as a bar scanner, LIDAR, or holographic recording, for example. Described herein are systems and methods for processing (e.g., recording) holographic stereograms. The HSs require very little computation (unlike CGHs), and can render 3D images from any source (unlike regular holography). This means that either real or computer generated models can be processed and displayed in real time. Even data cubes coming from instruments such as radar or medical instruments can be used to generate an HS.

In our quest to improve the speed of HS displays, several fundamental factors should be considered: the recording material dynamics, the laser source repetition rate, the spatial light modulator refresh rate, and the optical setup overall speed. In regard to the hologram refresh rate, it is worth noting that since HSs are composed of multiple hogels, the writing rate of these hogels must be much faster than the overall image refreshing pace. Without taking any spatial multiplexing into account, the hogel writing rate should be equal to the image refresh rate multiplied by the number of hogels, which can easily ramp up to several kHz.

Photorefractive materials have already been shown to be capable of sub-millisecond response time. Likewise, a high repetition rate (kHz) laser working with that type of material has also been presented. Considering the SLM that is forming the object beam, liquid crystal on silicon (LCoS) technology with a maximum repetition rate of hundreds of Hz, is not fast enough to support the required hogel writing rate. An alternative technology is digital micro-mirror devices (DMD), such as the Texas Instruments DLP®, which is capable of a binary image refresh rate up to 32 kHz.

In our past embodiments of the HS display setup, the speed of the recording was limited by the mechanical translation stage needed to scan the surface of the screen. In the present disclosure, a solution is provided that avoids the use of a translation stage, allowing for a faster recording speed, and supporting a fast and continuous update of the HS 3D images.

In an example embodiment, a system for processing holographic stereograms comprises: a holographic recording material; a belt spaced from the holographic recording material and disposed to be translated along at least one axis, wherein the belt comprises one or more holographic lenses coupled thereto; a spatial light modulator configured to cause an object beam to pass through the one or more holographic lenses such that the one or more holographic lenses focus the object beam onto the holographic recording material; and a light source configured to cause a reference beam to be incident on the holographic recording material such that the holographic recording material stores information based on one or more of the reference beam and the object beam.

In an example embodiment, a system for processing holographic stereograms comprises: a holographic recording material; a belt spaced from the holographic recording material and disposed to be translated in a continuous circuit, wherein the belt comprises a plurality of holographic lenses coupled thereto and arranged in a prescribed pattern; a spatial light modulator configured to cause an object beam to pass through the holographic lenses such that the holographic lenses focus the object beam onto the holographic recording material; and a light source configured to cause a reference beam to be incident on the holographic recording material such that the holographic recording material stores information based on one or more of the reference beam and the object beam.

In an example embodiment, a system comprises: a belt disposed to be translated along at least one axis, wherein the belt comprises a plurality of holographic lenses coupled thereto; and a spatial light modulator configured to cause an object beam to pass through one or more of the plurality of holographic lenses such that the one or more holographic lenses cause the object beam to converge or diverge as the belt is translated.

In an example embodiment, a system comprising: a first spatial light modulator for displaying one or more diffraction lenses; and a first spatial light modulator configured to cause an object beam to pass through the one or more diffraction lenses such that the one or more diffraction lenses cause the object beam to diffract, wherein a focal location of the diffracted object beam is shifted based at least on a configuration of the one or more diffraction lenses.

BRIEF DESCRIPTION OF THE DRAWINGS

FIGS. 2(A)-2(B) illustrates schematic representations of the optical setup configuration used to record the HS continuously, wherein FIG. 2(A) shows a rotating belt driven by four rollers, slit apertures above holographic lenses and FIG. 2(B) shows an object beam formation by reflection from a spatial light modulator (SLM) and focusing along a line by the holographic cylindrical lenses.

DETAILED DESCRIPTION

Optical System Configuration

Figures 1A, 1B:
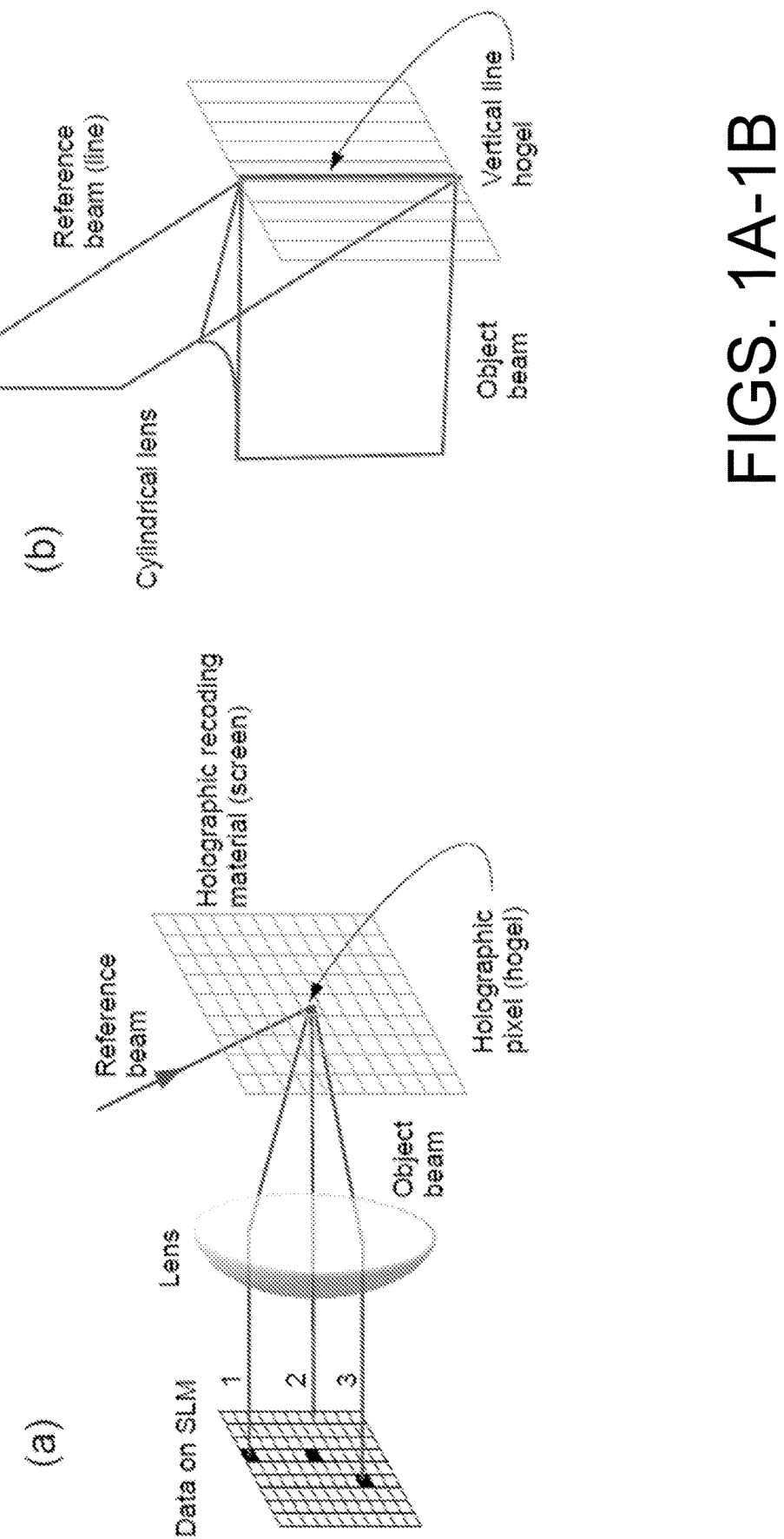
FIGS. 1(A)-1(D) illustrate hogel recording for a full parallax HS in FIG. 1(A), and a horizontal parallax only HS in FIG. 1(B). Diffraction by a single hogel during the reading of a HS for full parallax in FIG. 1(C), and horizontal parallax only HS in FIG. 1(D).

One configuration for recording of a single HS hogel is presented in FIG. 1(A). The hogel is recorded from the interference between two mutually coherent beams: a reference, and an object beam carrying the information. After being spatially structured by an SLM, the object beam is focused by a lens to form a cone of light whose intensity is angularly modulated by the information displayed on the SLM. In the case of an horizontal parallax only HS (FIG. 1(B)), the beam is focused along a line using a cylindrical lens instead of a spherical lens. The entire HS is recorded when the hogels have filled the whole surface of the screen.

Figure 1C:
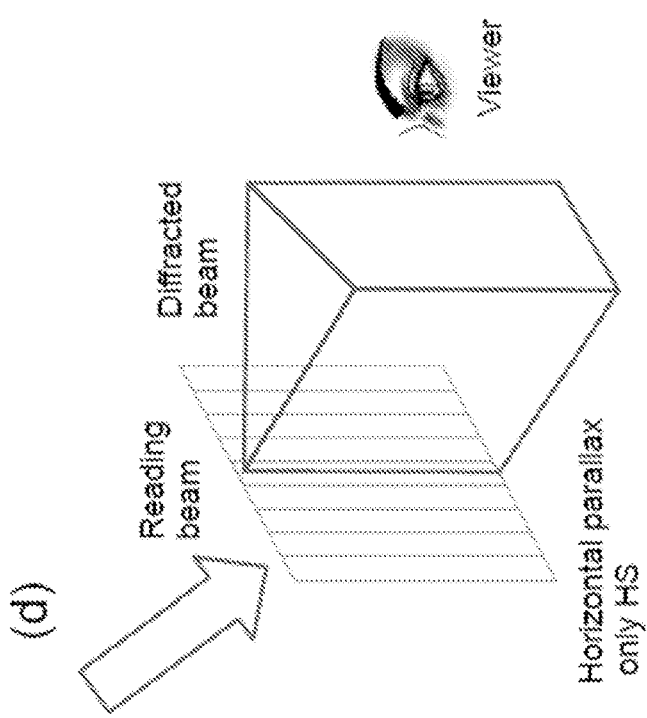

When replayed, the individual hogels composing the HS diffract the reading beam into the same structured cones of light that were comprised by the object beam. These cones reproduce the initial angularly modulated intensity as shown in FIGS. 1(C) and (D).

Altogether, the angularly modulated cones of light diffracted by the hogels overlap each others to form an image with both spatial and angular structure, giving the impression of parallax. The spatial extent of the hogels defines the lateral resolution of the image, while the angular resolution is given by the SLM pixel pitch, and the focusing lens numerical aperture.

One advantage of a horizontal parallax only system is that it reduces the number of hogels that need to be recorded by the square root of the number needed for full parallax (size and resolution kept constant). Horizontal-parallax-only 3D images are acceptable in a large number of applications because the human eye separation is along a horizontal line, and vertical parallax is only a secondary cue for depth perception.

Figure 1D:
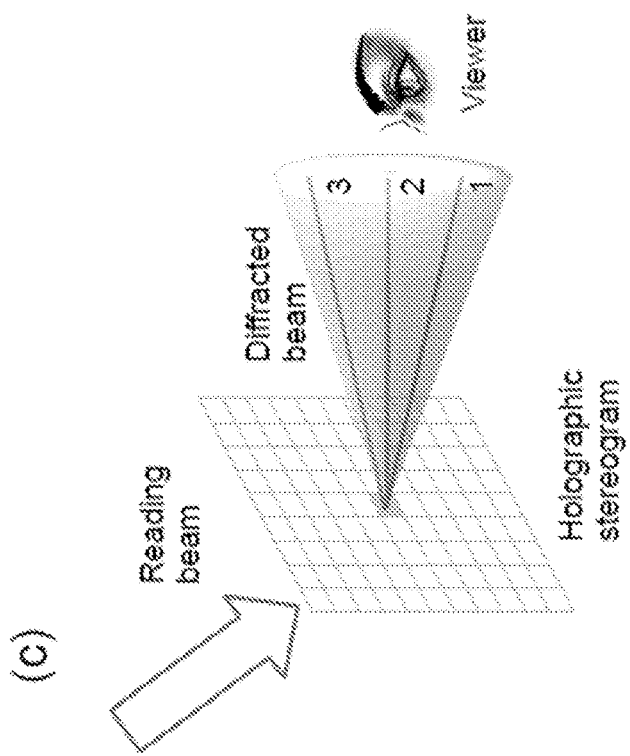

From the hogel recording and replaying geometries presented in FIG. 1, it can be seen that the central axis of the cone forming the object beam needs to be kept parallel for every hogel. This prevents the use of a rotating mirror to raster scan the surface of the screen, for example, because a rotating mirror may introduce angular distortion within each hogel. Therefore, the object beam may be translated and not rotated with respect to the screen. This operation is usually accomplished using a mechanical translation stage supporting either the screen, or the lens and the SLM.

One problem with using a translation stage is the maximum speed at which it is able to move from one hogel location to the next, and the inertia of the entire system. When a CW laser is used for the recording, the displacement needs to be stopped at each hogel location and some period of time is required for the vibrations to dissipate. This is because the interference fringes must be stable during the recording.

The use of a nanosecond pulsed laser improves the recording speed because it allows for a continuous displacement instead of the stop, pause, and record procedure. However, even in this case, the recording speed is still limited by the need to reverse direction and go back the entire span of the image at the end of each line of the raster. The mechanical constraints of such a system do not support recording faster than a couple of lines per second.

Figures 2A, 2B:
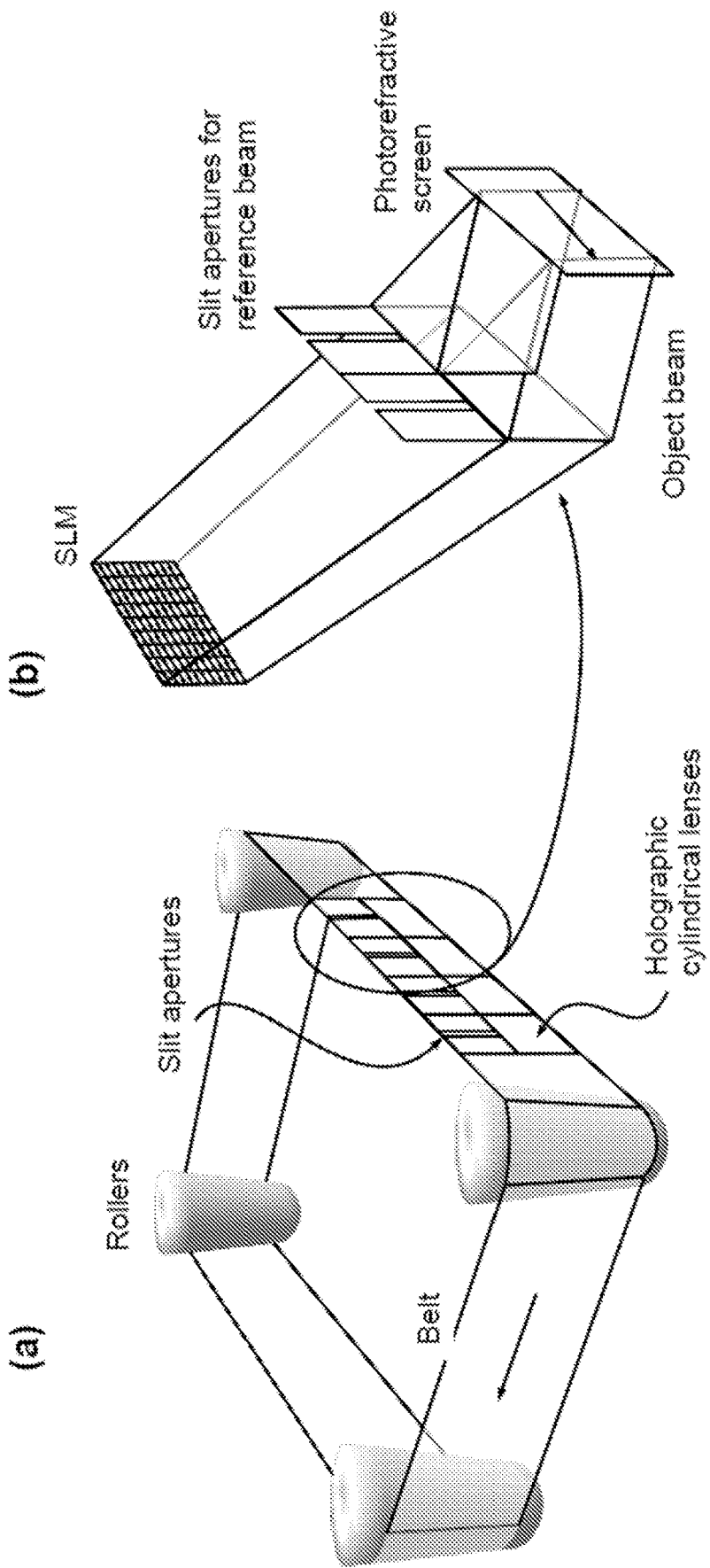

The embodiment presented in FIG. 2(A), makes use of a series of holographic cylindrical lenses affixed on a rotating belt. On the same belt, and above each lens, is a slit aperture that shapes the reference beam. FIG. 2(B) shows the object beam emitting from the SLM, and then diffracted into cones by the holographic lenses. As an example, the object beam may be formed by reflection from the SLM. Other mechanisms may be used. As such, when the belt rotates, the lenses translate, and the line forming the hogel spans the width of the screen.

Although the configuration shown is for horizontal parallax only, the system can be generalized for full parallax 3D images. In this case the holographic lenses should be spherical, and offset vertically from one another to form a staircase pattern. This will ensure the recording covers the entire surface of the screen. This configuration can be compared to a linear Nipkow disk.

One advantage of using a rotating belt instead of a translation stage is that the recording of the HS is continuous. There is no back and forth movement to reset the position of the lens in between each image. This continuous movement allows for a much faster speed and the continuous refresh of the holographic image.

To take full advantage of the image refreshing capability of this system, the holographic lenses may be located right next to each other, with no gap in between. This means that the separation between two recording lines is equal to the width of the lenses. This width also defines the size of the image such that, when one object beam exits the screen, a new one immediately enters at the other end of the screen.

As an illustrative example, to ensure that the entire cone of light is structured by the information displayed on the SLM, only half the lateral extend of the SLM may be used per hogel. This can be understood when looking at the moment when the last and first hogels of the image are being recorded. This case is illustrated in FIG. 2(B), where it can be seen that the SLM is structuring both object beams at once. Therefore, only half the SLM width is used per beam.

Because the size of the holographic lenses is much larger than the SLM, a telescope is used in the optical setup to expand the size of the object beam after the information is encoded by the SLM.

Figure 3:
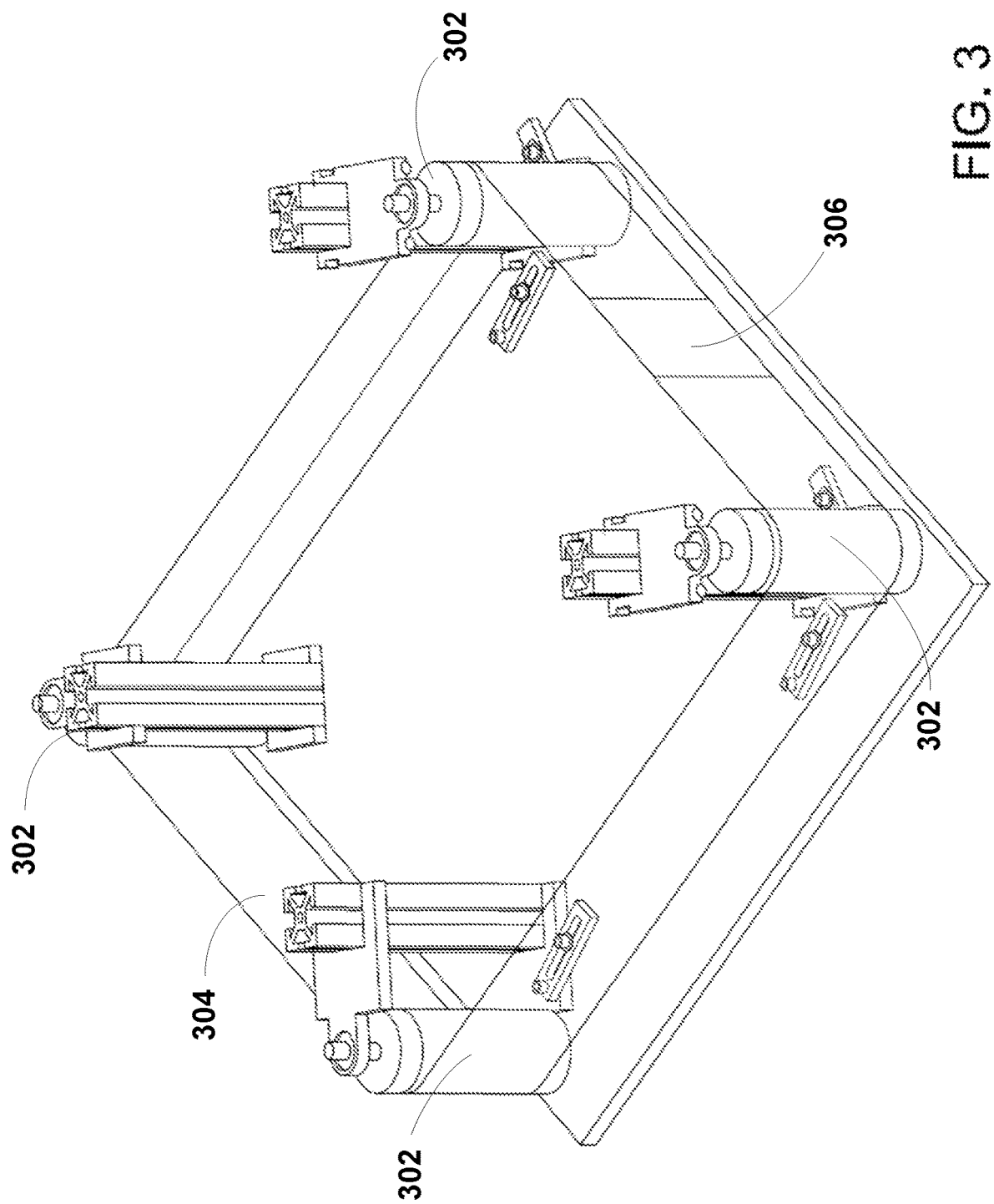
FIG. 3 illustrates a diagrammatic representation of an exemplary recording setup.

Optical System Implementation:

FIG. 3 illustrates an exemplary system configuration. As an illustrative example, four rollers 302 are used to support a transparent belt 304 made of flexible clear polycarbonate. Any number of rollers or other translation mechanisms may be used. A brushless motor (not shown) from Aerotech (BMS100) is driving at least one of the rollers. As a further example, a plurality of holographic lenses 306 have been permanently recorded into Bayfol® HX 200 photopolymer from Covestro. A recording beam is incident at an angle to the belt (e.g., passing through a slit in the belt). An object beam is diffracted by the holographic lens to form a converging object beam. Both object and reference beams superimpose into a hogel line at the location of the photorefractive screen (not present in the picture).

As an illustrative example, the system is configured so that the diffraction angle of the holographic lenses, and their respective focal lengths are such that the reference beam formed by the slit aperture is incident at the same angle as the beam incident to the holographic lenses. This allows us to have only one single beam incident on the belt, and reduces the number of optical elements forming the reference and object beams. Other configurations may be used to translate the belt in at least one axis.

The laser source is a 6 nanosecond pulsed doubled YAG from Innolas with a repetition rate of 100 Hz. This laser has up to 200 mJ per pulse of power with a wavelength of 532 nm. The power delivered to the sample was adjusted so the HS is recorded with a diffraction efficiency strong enough for the image to be seen, but weak enough so the next recording erases the previous image.

The power at the sample location was measured to be 5 mJ per pulse and per beam. The beam ratio was split equally (50:50) between object and reference.

The SLM is a DLP R 7000 from Texas Instruments. It is composed of an array of 1024×768 micromirrors with a 13:68 μm pitch. The mirrors can take a +/−12 degree orientation, directing the light either to form the object beam (bright state), or to a beam block (dark state). Binary patterns can be displayed with a refreshing rate of up to 32 kHz. 8-bit grey patterns can be obtained by the vibration of the mirror and temporal integration of the human eye. However, this scheme is not applicable in our case due to the short pulsed laser source that illuminates the mirror for only 6 ns.

The holographic screen is made of a 100 μm thick photorefractive polymer held between two glass plates whose interior surfaces are covered with ITO electrodes. Other sizes and materials may be used. The photorefractive material may be made of a copolymer with a polyacrylic backbone where tetraphenyldiaminobiphenyl (TPD) and carbaldehyde aniline (CAAN) pendent groups were attached in the ratio 10:1 (PATPD/CAAN). Fluorinated dicyanostyrene (FDCST) was used as a chromophore. To increase the sensitivity to the visible region of the spectrum, a fullerene derivative, PCBM ([6,6]-phenyl-C 61-butyric acid methyl ester) was added. Finally, 9-ethyl carbazole (ECZ) was used as a plasticizer to lower the glass temperature. The weight ratio of the different components is PATPD/CAAN:FDCST:ECZ:PCBM (49.5:30:20:0.5 wt %). An external electric field of 60 V/μm is applied to the material during the recording of the HS.

The system is driven by a computer using a National Instruments LabVIEW Virtual Instrumentation(VI) routine. The VI routine displays the information on the SLM, positions the belt to form the hogel at a specific location on the photorefractive screen, and triggers the laser. Since the laser pulse is only 6 ns, the belt can move continuously, and does not have to be stopped during the recording.

The hologram is read by a collimated red LED with a central wavelength of 640 nm, and a 20 nm bandwidth. To satisfy the Bragg condition, the reading beam is incident at a larger angle than the recording beam (30°), which allows it to clear (does not pass through) the slit aperture and the holographic lens.

The reading is continuous, and happens during the recording. To protect the viewer from the pulsed laser light, a 105 orange LEE Filter absorbing the green 532 nm light, but letting the red 640 nm reading light pass through, is placed on top of the photorefractive sample (viewer side).

The present disclosure comprises the following aspects.

Aspect 1. A system for processing holographic stereograms, the system comprising: a holographic recording material; a belt spaced from the holographic recording material and disposed to be translated along at least one axis, wherein the belt comprises one or more holographic lenses coupled thereto; a spatial light modulator configured to cause an object beam to pass through the one or more holographic lenses such that the one or more holographic lenses focus the object beam onto the holographic recording material; and a light source configured to cause a reference beam to be incident on the holographic recording material such that the holographic recording material stores information based on the reference beam and the object beam.

Aspect 2. The system of aspect 1, wherein the holographic recording material comprises a photorefractive screen.

Aspect 3. The system of any one of aspects 1-2, wherein the belt comprises a plurality of holographic lenses.

Aspect 4. The system of any one of aspects 1-3, wherein the belt comprises a sequence of arranged holographic lenses.

Aspect 5. The system of any one of aspects 1-4, wherein the belt comprises one or more apertures configured to allow the reference beam to pass therethrough.

Aspect 6. The system of any one of aspects 1-5, wherein the belt comprises one or more slit apertures configured to allow the reference beam to pass therethrough.

Aspect 7. The system of any one of aspects 1-6, further comprising a plurality of rollers configure to cause the translation of the belt.

Aspect 8. The system of any one of aspects 1-7, wherein the translation of the belt is continuous and the storage of information on the holographic recording material is continuous.

Aspect 9. A method of using the system of any one of aspects 1-8.

Aspect 10. A method of making the system of any one of aspects 1-8.

Aspect 11. A system for processing holographic stereograms, the system comprising: a holographic recording material; a belt spaced from the holographic recording material and disposed to be translated in a continuous circuit, wherein the belt comprises a plurality of holographic lenses coupled thereto and arranged in a prescribed pattern; a spatial light modulator configured to cause an object beam to pass through the holographic lenses such that the holographic lenses focus the object beam onto the holographic recording material; and a light source configured to cause a reference beam to be incident on the holographic recording material such that the holographic recording material stores information based on the reference beam and the object beam.

Aspect 12. The system of aspect 11, wherein the holographic recording material comprises a photorefractive screen.

Aspect 13. The system of any one of aspects 11-12, wherein the plurality of holographic lenses comprises a spherical lens.

Aspect 14. The system of any one of aspects 11-13, wherein the plurality of holographic lenses comprises a cylindrical lens.

Aspect 15. The system of any one of aspects 11-14, wherein the belt comprises one or more apertures configured to allow the reference beam to pass therethrough.

Aspect 16. The system of any one of aspects 11-15, wherein the belt comprises one or more slit apertures configured to allow the reference beam to pass therethrough.

Aspect 17. The system of any one of aspects 11-16, further comprising a plurality of rollers configure to cause the translation of the belt.

Aspect 18. The system of any one of aspects 11-17, wherein the translation of the belt is continuous and the storage of information on the holographic recording material is continuous.

Aspect 19. A method of using the system of any one of claims 11-18.

Aspect 20. A method of making the system of any one of claims 11-18.

Aspect 21. A system comprising: a belt disposed to be translated along at least one axis, wherein the belt comprises a plurality of holographic lenses coupled thereto; and a spatial light modulator configured to cause an object beam to pass through one or more of the plurality of holographic lenses such that the one or more holographic lenses cause the object beam to converge or diverge as the belt is translated.

Aspect 22. The system of aspect 21, wherein the plurality of holographic lenses are arranged in a sequence based on at least the direction of translation of the belt.

Aspect 23. The system of any one of aspects 21-22, further comprising a plurality of rollers configure to cause the translation of the belt.

Aspect 24. The system of any one of aspects 21-23, wherein the translation of the belt is continuous.

Aspect 25. A method of using the system of any one of aspects 21-24.

Aspect 26. A method of making the system of any one of aspects 21-24.

Aspect 27. A system comprising: a first spatial light modulator for displaying one or more diffraction lenses; and a second spatial light modulator configured to cause an object beam to pass through the one or more diffraction lenses such that the one or more diffraction lenses cause the object beam to diffract, wherein a focal location of the diffracted object beam is shifted based at least on a configuration of the one or more diffraction lenses.

Aspect 28. The system of aspect 27, wherein the focal location is synchronous with hogel data represented by the object beam.

Aspect 29. A method of using the system of any one of claims 27-28.

Aspect 30. A method of making the system of any one of claims 27-28.

The systems and methods of the present disclosure eliminate a conventional translation stage that shifts the recording beams back and forth, and replaced it by an uninterrupted transparent belt holding holographic lenses. The belt may be driven along a perimeter, shifting the lens laterally in front of a photorefractive screen without reversing direction. The holographic lenses focus the object beam onto holographic pixels for recordation in a thin photopolymer. The photopolymer material is flexible enough for the lenses to follow the curvature of the belt when it goes around the tensioning rollers. The hogel data are uploaded sequentially onto a SLM to form the object beam. The rotation of the belt in one single direction allows for a continuous operation, and a much faster recording speed than with a translation stage that needs to reverse direction at the end of its travel span.

To make a more compact system, it is also possible to replace the belt and the holographic lenses with a SLM that displays Fresnel diffraction lenses. This SLM will diffract the laser light to form the object beam (e.g., cone) with shifting focal location. The focal location may be synchronous with the hogel data. As an example, a second SLM may be configured to cause an object beam to pass through the one or more displayed diffraction lenses such that the one or more diffraction lenses cause the object beam to diffract. This operation is similar in operation to the belt comprising the diffraction lenses, but with the diffraction lenses displayed via an SLM as opposed to the being disposed on the belt. The systems presented herein are a step toward fast and continuous recording of holographic stereogram, and could lead to the development of an auto-stereoscopic 3D television with the reproduction of motion parallax and occlusion.

Figure 4:
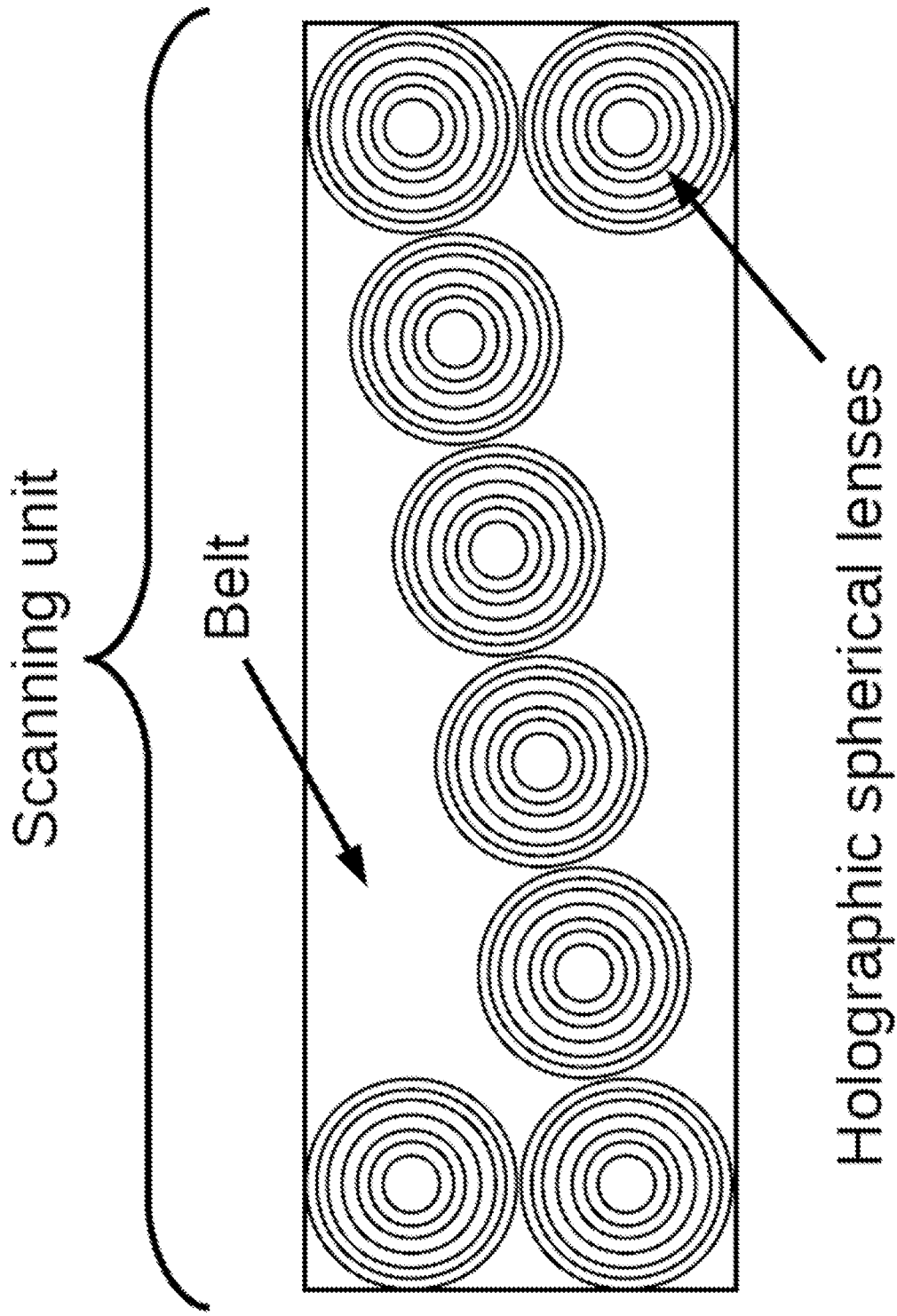
FIG. 4 illustrates a sawtooth configuration of the spherical lenses to record a full parallax HS. Such a configuration may be repeated over the entire length of a belt of the present disclosure.

It is also possible to record full parallax HS using one or more of the systems of the present disclosure. As an illustrative example, cylindrical lenses forming the object beam may be replaced by spherical lenses. To take care of the vertical scanning, the spherical lenses may be arranged in a sawtooth configuration as presented in FIG. 4 such that each lens is scanning a different row when the belt is moving. Moreover to eliminate the slit apertures used to form the reference beam, an unexpanded beam can be steered from so it reduces any angular artifact (e.g., with a gimbals system). As an example, it is possible to use a gimbals steering mechanism and direct a beam with the appropriate shape (line for horizontal parallax only, unexpanded for full parallax) directly to the hogel location. As such, the reference beam may be collimated and so does not need to pass through a lens as the object beam does. To maximize the diffraction efficiency during the reading of the hologram, the point of rotation of the gimbals can be located at the same distance as the point source used to read the hologram. This way, the incidence angles are identical for the writing reference beams and the reading beam, which maximize the diffraction efficiency.

What is claimed is:

1. A translational beam system comprising:
a belt disposed to be translated along at least one axis, wherein the belt comprises a plurality of lenses coupled thereto, wherein the belt comprises one or more apertures configured to allow a reference beam to pass therethrough; and
a spatial light modulator configured to cause an object beam to pass through one or more of the plurality of lenses as the belt is translated, wherein the one or more lenses cause the object beam to converge or diverge.

2. The system of claim 1, wherein the plurality of lenses are arranged in a sequence based on at least the direction of translation of the belt.

3. The system of claim 1, further comprising a plurality of rollers configure to cause the translation of the belt.

4. The system of claim 1, wherein the translation of the belt is continuous.

5. The system of claim 1, wherein the plurality of lenses comprise one or more holographic lenses.

6. The system of claim 1, further comprising:
a holographic recording material, wherein the belt is spaced from the holographic recording material, wherein the plurality of lenses comprise one or more holographic lenses, wherein the spatial light modulator is configured to cause the object beam to pass through the one or more holographic lenses such that the one or more holographic lenses focus the object beam onto the holographic recording material; and
a light source configured to cause the reference beam to be incident on the holographic recording material such that the holographic recording material stores information based on interference between the reference beam and the object beam.

7. The system of claim 6, wherein the holographic recording material comprises a photorefractive screen.

8. The system of claim 6, wherein the one or more apertures include one or more slit apertures.

9. The system of claim 6, wherein the translation of the belt is continuous and the storage of information on the holographic recording material is continuous.

10. A system for processing holographic stereograms, the system comprising:
a holographic recording material;
a belt spaced from the holographic recording material and disposed to be translated in a continuous circuit, wherein the belt comprises a plurality of holographic lenses coupled thereto and arranged in a prescribed pattern;
a spatial light modulator configured to cause an object beam to pass through the holographic lenses such that the holographic lenses focus the object beam onto the holographic recording material;
and a light source configured to cause a reference beam to be incident on the holographic recording material such that the holographic recording material stores information based on interference between the reference beam and the object beam, wherein the belt comprises one or more apertures configured to allow the reference beam to pass therethrough.

11. The system of claim 10, wherein the holographic recording material comprises a photorefractive screen.

12. The system of claim 10, wherein the plurality of holographic lenses comprises a spherical lens or a cylindrical lens, or both.

13. The system of claim 10, wherein the one or more apertures include one or more slit apertures.

14. The system of claim 10, further comprising a plurality of rollers configure to cause the translation of the belt.

15. The system of claim 10, wherein the translation of the belt is continuous and the storage of information on the holographic recording material is continuous.

* * * * *